(12) United States Patent
Lamson

(10) Patent No.: US 6,688,873 B1
(45) Date of Patent: Feb. 10, 2004

(54) PLUG ASSIST QUICK CHANGE MOUNTING FOR THERMOFORMER TOOLING

(75) Inventor: Wayne W. Lamson, Beaverton, MI (US)

(73) Assignee: Brown Machine, LLC., Beaverton, MI (US)

( * ) Notice: Subject to any disclaimer, the term of this patent is extended or adjusted under 35 U.S.C. 154(b) by 172 days.

(21) Appl. No.: 10/012,191

(22) Filed: Dec. 5, 2001

(51) Int. Cl.[7] .............................................. B29C 51/26
(52) U.S. Cl. ........................ 425/193; 425/468; 425/472; 249/177
(58) Field of Search .................. 425/182, 193, 425/467, 472, 468, 395, 390, 393; 249/64, 176, 177

(56) References Cited

U.S. PATENT DOCUMENTS

| | | | |
|---|---|---|---|
| 3,740,178 A | * | 6/1973 | Neil ........................... 425/182 |
| 4,500,277 A | * | 2/1985 | Bullock et al. ........... 425/387.1 |
| 4,636,349 A | * | 1/1987 | MacLaughlin .............. 425/384 |
| 5,607,704 A | * | 3/1997 | Schlierenkamper et al. 425/193 |
| 6,440,354 B1 | * | 8/2002 | Takai et al. ................. 264/550 |

* cited by examiner

Primary Examiner—Robert Davis
Assistant Examiner—ThuKhanh T. Nguyen
(74) Attorney, Agent, or Firm—John R. Benefiel

(57) ABSTRACT

A quick change mounting for each plug assist in an array of plug assists, carried by a base plate in a thermoformer apparatus includes a boss projecting from an anchor piece attached to the base plate and a base piece attached to each plug assist, each base having a bore slidably receiving a boss. Each boss has a cross pin with projecting ends each which being received in respective axial slot in the associated base piece, a circumferential clearance space extending from the end of each axial slot allowing rotation of the plug assist, the pin ends each releasably held at the end of a circumferential space by a detent.

10 Claims, 4 Drawing Sheets

PLUG ASSIST QUICK CHANGE MOUNTING FOR THERMOFORMER TOOLING

BACKGROUND OF THE INVENTION

This invention concerns thermoforming apparatus in which multiple products are formed from preheated sheet plastic material by drawing the sheet material into conformity with mold cavities using vacuum and/or air pressure to form a plurality of products. For such products, as disposable plastic drinking cups, a number of products are formed simultaneously usually in a rectangular array of several rows, such as an 8×10 array.

In such apparatus, plug assists are usually used for products such as large disposable cups to aid the stretching of the sheet material as it is drawn into a female mold cavity to control the stretching of the plastic occurring when the heated sheet material is drawn into the cavity. The plug assists are male shaped tooling members fixed to a plate in rows, each plug assist aligned with a respective female cavity and extending towards the same in the thermoforming machine. The distending of the plastic sheet material by the plug assists as well as the clamping of the material prevents excessive localized thinning of the material as it is stretched into conformity with the mold cavity by the action of the vacuum and/or air pressure.

Sometimes, various sized parts are run on the same thermoforming machine, necessitating changing the tooling, including the plug assists. Also, individual broken plug assists occasionally have to be replaced.

In such situations, the plug assists are manually disassembled using suitable tools In the past, arrangements have been incorporated in the plug assist mountings to speed the process of accomplishing changeover, since as many as 80 or more such plug assist removals and replacements could be required to be carried out.

In one arrangement, a series of lengthwise cam bars extending along rows of plug assists are operated to release all of the plug assists in each row from their respective bases, (or to lock all of the same thereto), but these arrangements have required costly precision machined components.

Another approach has been to install pneumatic or electro-mechanically operated mountings which can be simultaneously released. This approach is also quite costly.

Any connection for the plug assists must be secure and not be loosened over the course of thousands of press cycles since loosening could cause severe tooling damage. Furthermore, the mounting must provide precision location of the plug assists in order to be accurately aligned with the respective mold cavity to create proper stretching of the plastic sheet material.

It is the object of the present invention to provide a simplified, less costly plug assist mounting for thermoformer tooling which accurately locates the plug assist while still allowing a quick changeover and insuring a very secure connection.

SUMMARY OF THE INVENTION

This object and others which will become apparent upon a reading of the following specification and claims are achieved by providing a precision quick change mounting for each individual plug assist which allows a rapid manual installation for each individual plug assist without the use of tools, which can be accomplished with little more time and effort than is required to simply lift each plug assist from the base plate. Thus, the time for making a changeover is approximately the same as for simply lifting each plug assist from the base plate as was required in the prior designs using a cam bar release or pneumatic or electro-mechanical simultaneous release for multiple plug assists, but at a much lower cost and with improved reliability.

The mounting according to the invention comprises a boss projecting up from an anchor piece attached to the base plate, or alternatively, attached to the plug assist driving rods, to hold the array of plug assists. A cross dowel pin has ends projecting out radially from opposite sides of the boss at an intermediate height thereof.

The plug assist itself, which may be formed of syntactic foam, is attached as by gluing to a plug bottom piece, which is in turn secured such as by threads or other method to the plug base. The plug base is formed with an internal bore sized to slidably receive the anchor boss to be accurately radially located thereon engaging a radial face of the flange of the anchor piece to be accurately located vertically on the anchor piece.

Vertically extending radial slots are machined into the plug base piece located to receive the dowel cross pin ends when the plug base piece is received over the boss in a correct angular orientation. The vertical slots each extend to respective horizontal slot extending circumferentially along the perimeter of a base piece side wall, allowing the base piece to be manually rotated to cause the pin ends to travel to the end of a respective horizontal slot.

Each of a pair of opposing spring plungers are located adjacent the end of a respective horizontal slots so as to yieldably engage the sides of the pin end at points past the center thereof to capture the same and provide a detent.

The bottom of the horizontal slots accurately locates the base piece vertically on the base.

Alternatively, the cross pin can be yieldably mounted on the boss and a cam ramp ascended by the pin ends (cam rollers may be mounted on the pin ends to reduce friction) until a radiused seat is reached providing a detent.

That is, the boss and its pin can be mounted to the plug base. The receive, in turn, is then mounted to the plug base plate, or to the plug driving rods.

This low cost mechanical mounting accurately and securely locates each individual plug assist on the base plate allowing them to be quickly and easily removable almost as quickly and easily as simply lifting the plug assists after activation of cam bars, or pneumatic or electromechanically operated mounts.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
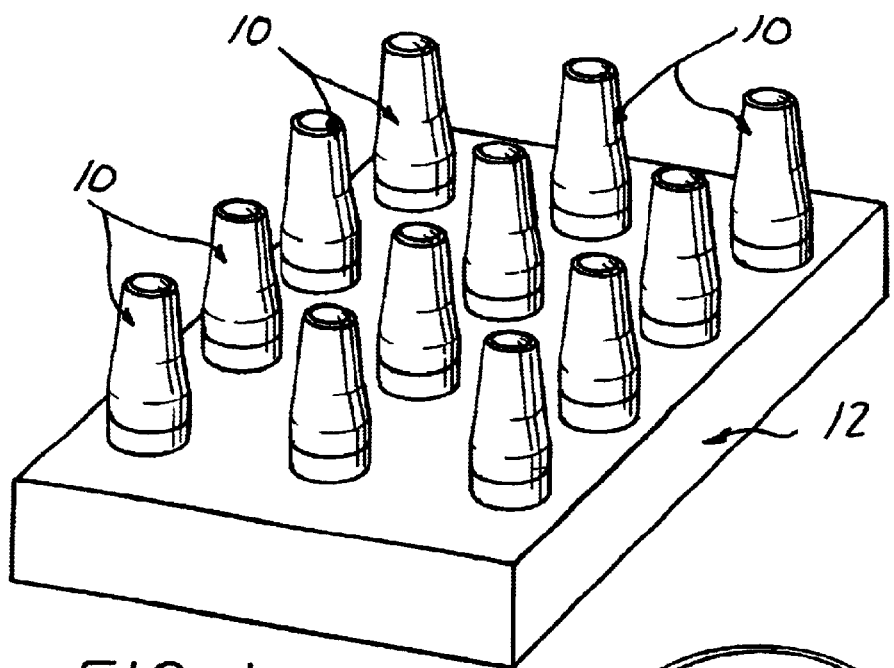
FIG. 1 is a perspective view of an array of plug assists mounted to a base plate by the quick change mounting according to the invention.
Figure 3:
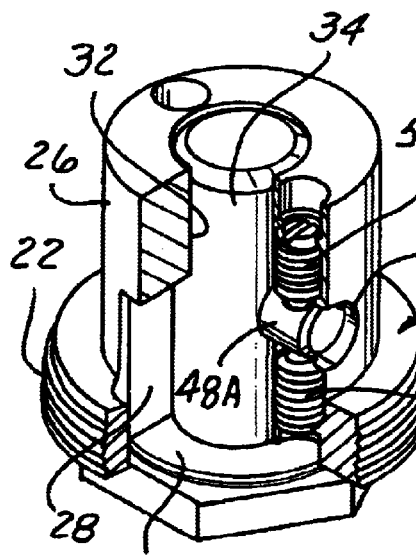
FIG. 3 is a perspective view partially broken away of a plug assist base and a mounting anchor piece for a boss on which the plug assist base is mounted.
Figure 2:
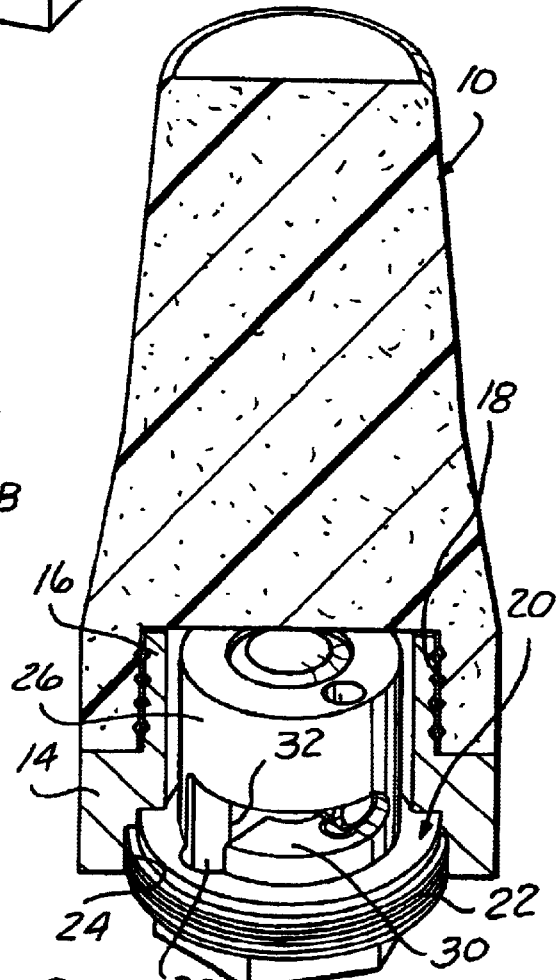
FIG. 2 is partially sectional enlarged view of one of the plug assists and quick change mounting therefor shown in FIG. 1.

FIG. 1 shows an array of plug assists 10 mounted to a base plate 12 shown in simplified form. A three by four array is shown, but larger arrays are common, i.e., an eight by ten array, such that many plug assists 10 must be changed when a size change is desired.

As is well known in the art, the thermoforming apparatus (not shown) mounts the base plate 12 in alignment with mold cavity tooling and moves the base plate 12 up to cause the plug assists 10 to distend overlying preheated plastic sheet material, stretching it into the mold cavities to assist the vacuum and/or air pressure induced movement of the plastic material drawing the same into conformity with the mold cavities in the manner well known in the art.

The quick change mounting according to the invention includes a plug assist bottom piece 14 having a cylindrical portion 16 received in a bore 18 formed into the lower end of the plug assist 10. Plug assists 10 are typically constructed of a material having a low specific heat and conductivity such as syntactic foam, and the plug assist bottom piece 14 may be constructed of aluminum. A suitable glued connection between the cylindrical portion 16 and bore 18 fixedly connects these components together.

A plug assist base 20 comprising a member affixed to the plug assist 10, has a tubular portion 26 received in a socket in the plug assist bottom piece 14, and a threaded diameter 22 is advanced into a threaded bore 24 in the plug assist bottom piece 14 to secure the same together. A set screw (not shown) secures this threaded connection.

A pair of vertical slots 28 are machined into the base 20 diametrically opposite each side, each slot 28 extending to a connected horizontal slot segment 30 at the upper end thereof.

Figure 4:
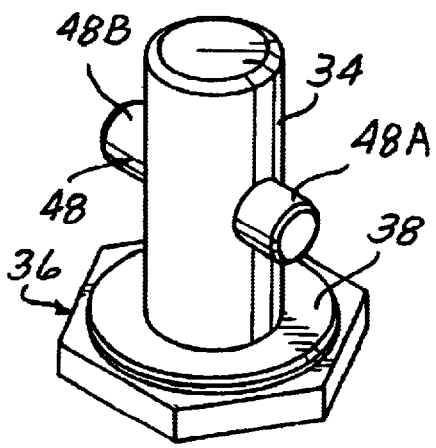
FIG. 4 is a perspective view of the anchor piece showing the attached or integral boss.

The base piece 20 has an internal bore 32 configured to receive an upstanding boss 34 integral with an anchor piece 36 (FIG. 4). The anchor piece 36 comprises a member fixed to the base plate as by being screwed thereinto at the location of each plug assist 10. A flange 38 surrounds the bottom end of the boss 34. The boss 34 has a dowel cross pin 48 mounted thereto having ends 48A, 48B projecting radially from the boss 34 at diametrically opposite sides of the boss 34, at an intermediate height on the boss 34.

The vertical slots 28 each define an axial clearance space configured to be able to slidably accept the cross pin ends 48A, 48B as the base bore 32 receives the boss 34 when the connected plug assist 10 is placed over one of the anchor pieces 36. Upon reaching the horizontal slot segments 30 which define circumferential clearance spaces, the plug assist 10 can be rotated to move the cross pin ends 48A, 48B to the ends 30A of the slots 30.

Figure 5:
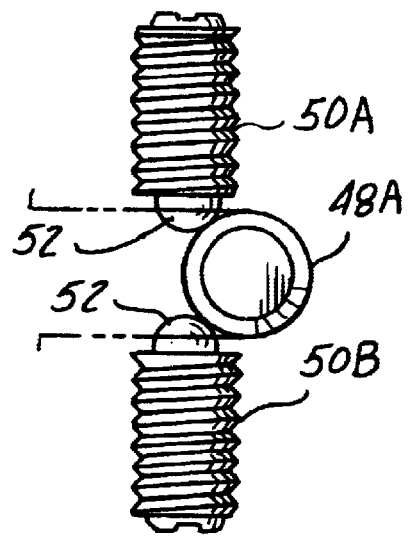
FIG. 5 is a perspective view of an opposing pair of threaded plugs each carrying a spring loaded ball engaging one end of the dowel cross pin on the boss.
Figure 6:
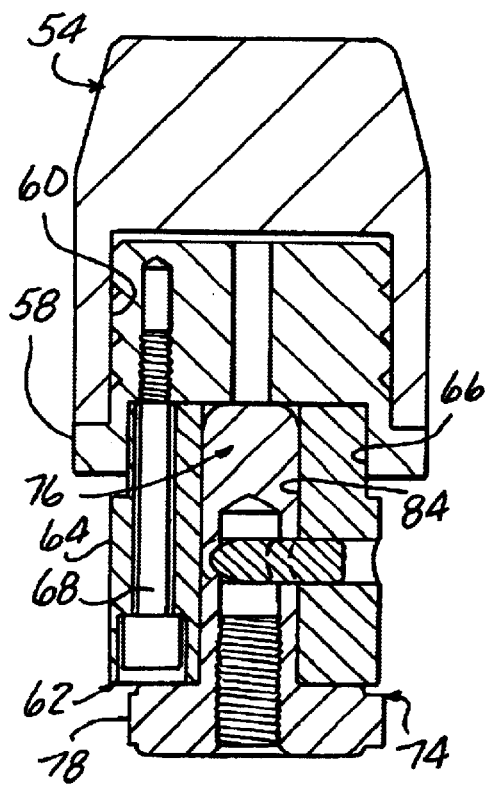
FIG. 6 is a perspective view of the plug assist and mounting for a smaller sized plug assist.
Figure 7:
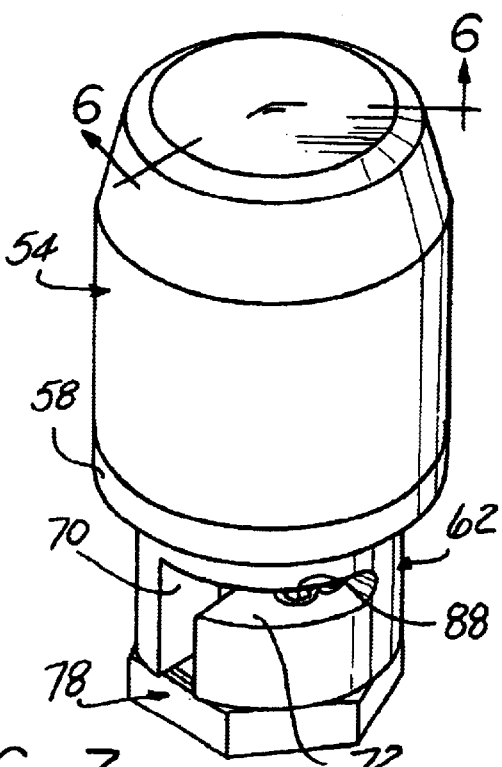
FIG. 7 is a sectional view taken through a quick change mounting according to the invention shown in FIG. 6.
Figure 8:
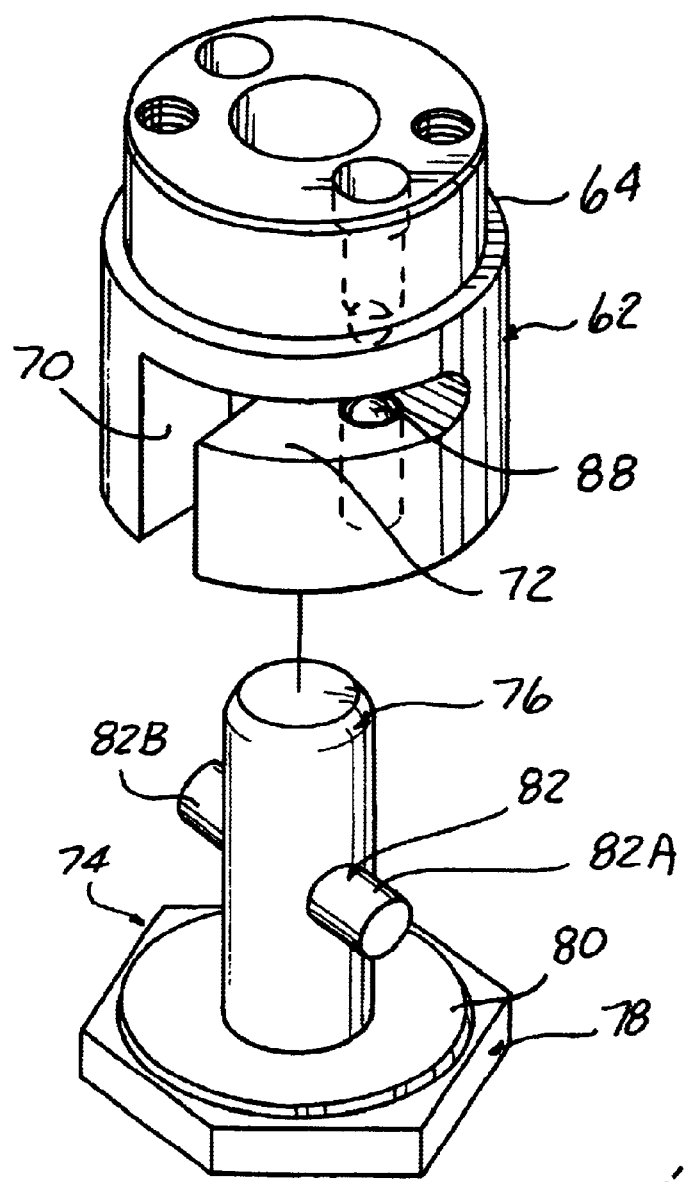
FIG. 8 is an exploded perspective view of the plug assist base and the flanged anchor piece shown in FIGS. 6 and 7.
Figure 9:
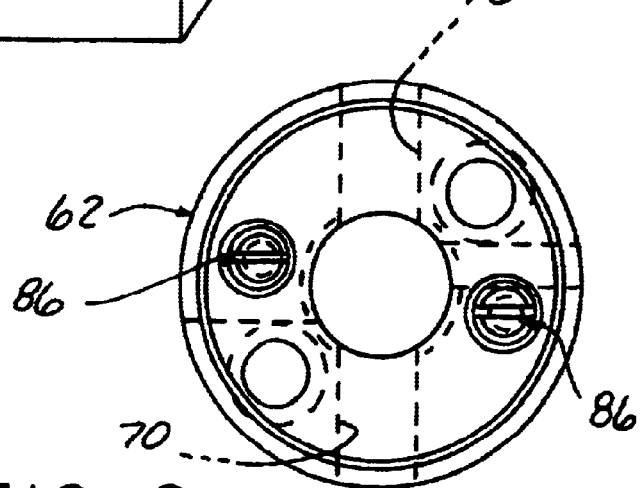
FIG. 9 is a plan view of the plug assist base shown in FIG. 8.

Two pairs of opposing threaded plugs 50A, 50B are threaded into axial bores 54A, 54B in the tubular portion 26 of the base 20, so that the plugs 50A, 50B are directed vertically at the slots 30 along a line just offset from the ends 30A of the slots 30. A spring loaded ball 52 is mounted in the end of each plug 50A, 50B which engages the cross pin end 48A at a point past the center line thereof (FIG. 5) so as to act to releasably hold the pin end 48A against the slot end 30A, thereby acting as a detent.

The flange surface 38 of the anchor piece 36 accurately locates the plug assist 12 vertically while the base 34 mating with the bore 32 locates the plug assist 12 laterally.

Thus, the plug assist 10 is tightly held in a seated position on the anchor piece 36, but may be quickly removed by rotating the same out of the slots 30, overcoming the detent force. When the pin ends 48A, 48B reach the vertical slots 28, the plug assist 10 can be simply lifted up to be removed.

FIGS. 6–9 show a slightly different design for a smaller plug assist 56, having a bottom piece 58 glued into a bore 60 in the end of the plug assist 54.

A plug assist base 62 has a tubular portion 64 received in a bore 66 in the bottom piece 58 secured therein with bolts 68.

Diametrically vertical slots 70 extend axially into the lower end of the base 62, each connecting to a respective horizontally slot segment 72.

An anchor piece 74 has an upright boss 76 fixed to a flange 78, having a radial locating surface 80. A dowel cross pin 82 has ends 82A, 82B protruding on either side of the boss 76. The boss 76 is received in a bore 84 in the base 62 when the plug assist 54 is installed. The anchor piece 74 is screwed to the base plate (not shown) to be affixed thereto.

Opposing pairs of threaded plugs 86 each having spring loaded balls 88 are installed in threaded holes located to one side of the ends of the slots 72 so as to engage the sides of the pin ends 82A, 82B when advanced to the ends of the slots 72 as in the above described embodiment.

Figure 10:
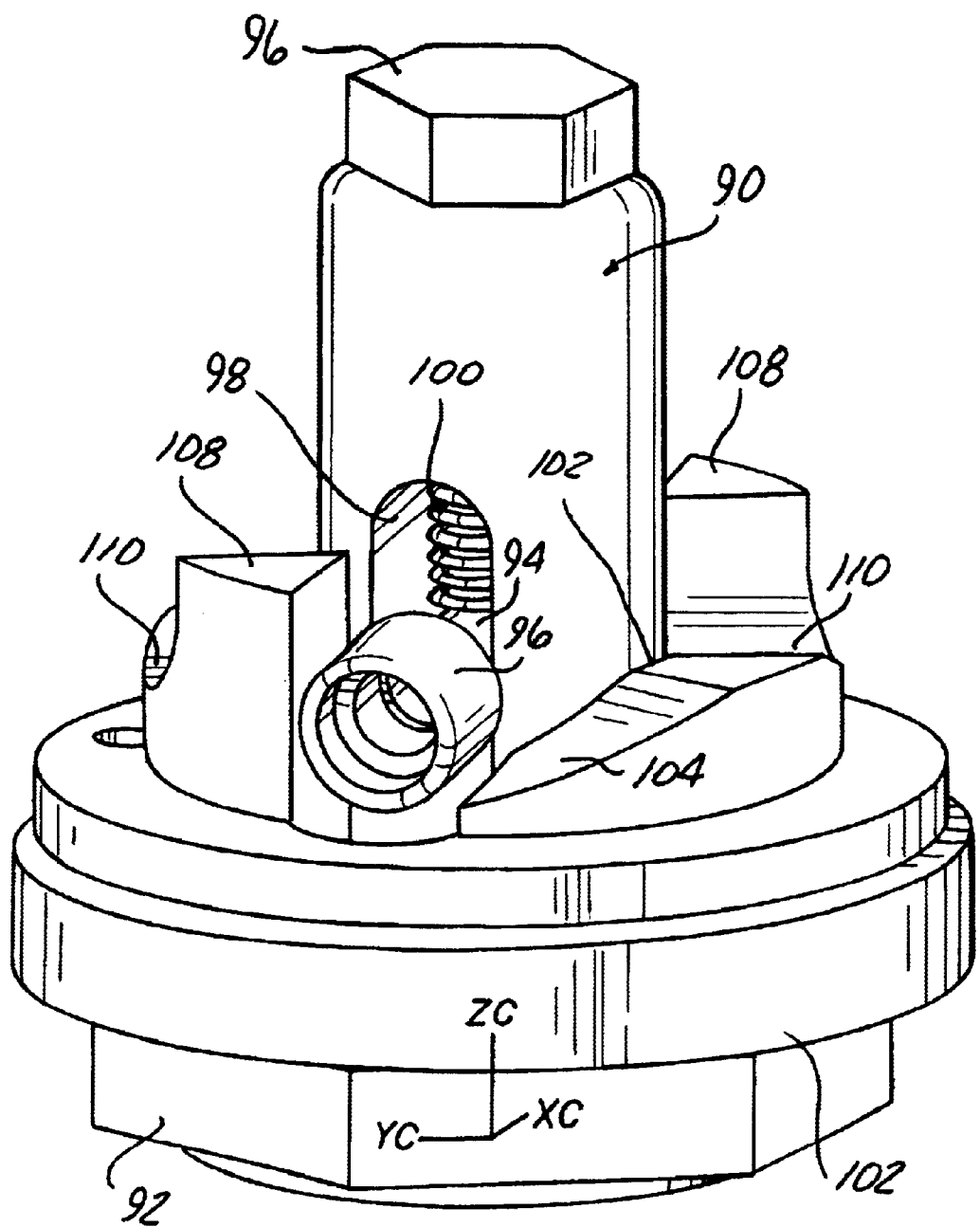
FIG. 10 is a perspective of an alternate embodiment of a quick change plug assist mounting according to the invention.

FIG. 10 shows an alternate embodiment where a boss 90 is attached to an anchor piece 92 by a bolt 93 yieldably mounts a cross pin 94 having cam rollers 96 at each end. The cross pin 94 is mounted in a slot 98 and is urged to a full down position by a spring 100.

A plug assist base 102 has cam ramps 104 for each cam roller 96 and a first cam rest 106 at one end of each cam roller 96 receiving the same when the boss 90 is inserted in a bore 106 in the base 102, with the cam rollers 96 aligned to one side of a vertical locator surface 108.

A second radiused cam seat 110 is at the end of each cam ramp 104 to provide a detent in the seated position.

Thus the simple, low cost mounting disclosed allows a rapid installation or removal of each plug assist which can be operated almost as quickly as simply lifting the plug assists off or on the base plate. The plug assists are accurately and securely located on the base plate when the installation is complete.

What is claimed is:

1. In a thermoformer having a plurality of plug assists mounted in an array to a base plate, the improvement comprising a quick change mounting for each of said plug assists, each said mounting comprising a first member affixed to a respective one of each of said plug assists and a second member affixed to said base plate, one of said members having a projecting portion and the other of said members having a bore slidably receiving said projecting portion when said plug assist is placed on said base plate, said projecting portion having at least one protruding pin end protruding from the side thereof, the other member having at least one axial clearance slot receiving said pin end when said projecting portion is slid into said bore, and further including a circumferential clearance connected to said axial clearance to allow said pin end to move circumferentially to allow limited rotation of said first and second members after reaching an end of said axial clearance, and a detent holding said pin end adjacent a rotated end position of said pin end in said circumferential clearance space in said other member.

2. The quick change plug assist mounting according to claim 1 wherein said detent comprises an opposing pair of plugs extending axially in said other member each having a spring loaded ball on the end thereof engaging a side of said pin end away from said end of said circumferential clearance space.

3. The quick change plug assist mounting according to claim 1 wherein axial clearance space comprises an axial slot, and said circumferential space comprises a circumferential slot connecting to said axial slot.

4. The quick change plug assist mounting according to claim 1 wherein said projecting portion of said one member comprises a boss.

5. The quick change plug assist mounting according to claim 4 wherein a pair of pin ends project from opposite sides of said boss, and wherein an axial and circumferential clearance spaces in said other member are provided for each pin end.

6. The quick change plug assist mounting according to claim 5 wherein a plug assist base affixed to each of said plug assists comprises said first member of each mounting and wherein an anchor piece for each plug assist affixed to said base plate comprises said second member of each mounting having a flange from which said boss projects.

7. The quick change plug assist mounting according to claim 6 wherein a radial face is formed on said anchor piece engaged with said base upon fully seating said base on said boss.

8. The quick change plug assist mounting according to claim 5 wherein said detent comprises a spring mounting of a cross pin having said projecting pin ends formed thereon, said cross pin in an axial slot in said boss, said circumferential clearance space being defined by a cam ramp surface on each opposite sides of said boss each engaging a respective one of said pin ends, and a radiused seat at an end of each cam ramp surface receiving and releasably holding a respective pin end.

9. The quick change plug assist mounting according to claim 5 wherein each base is fixedly held in a socket bore in a bottom piece fixedly attached to a bottom end of each plug assist.

10. The quick change plug assist mounting according to claim 9 wherein each bottom piece is threaded to a respective base piece.

* * * * *